United States Patent
Holden et al.

(10) Patent No.: US 10,341,745 B2
(45) Date of Patent: Jul. 2, 2019

(54) METHODS AND SYSTEMS FOR PROVIDING CONTENT

(71) Applicant: COMCAST CABLE COMMUNICATIONS, LLC, Philadelphia, PA (US)

(72) Inventors: Danial Holden, Denver, CO (US); Cherie Cremer, Berwyn, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 505 days.

(21) Appl. No.: 14/447,169

(22) Filed: Jul. 30, 2014

(65) Prior Publication Data

US 2016/0037189 A1  Feb. 4, 2016

(51) Int. Cl.
| | | |
|---|---|---|
| *H04N 7/173* | (2011.01) | |
| *H04N 21/8358* | (2011.01) | |
| *H04N 21/242* | (2011.01) | |
| *H04N 21/8547* | (2011.01) | |
| *H04N 21/236* | (2011.01) | |

(52) U.S. Cl.
CPC ....... *H04N 21/8358* (2013.01); *H04N 21/242* (2013.01); *H04N 21/8547* (2013.01); *H04N 21/23614* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,869,222 | B2 * | 10/2014 | Winograd | H04N 5/44 725/110 |
| 9,398,322 | B2 * | 7/2016 | Hawkins | H04N 21/4307 |
| 2006/0206618 | A1 | 9/2006 | Zimmer et al. | |
| 2014/0237082 | A1 * | 8/2014 | Chen | H04W 4/18 709/219 |

FOREIGN PATENT DOCUMENTS

| | | |
|---|---|---|
| WO | WO-2011/053858 A1 | 5/2011 |
| WO | WO-2012/154541 A1 | 11/2012 |

* cited by examiner

*Primary Examiner* — Mulugeta Mengesha
(74) *Attorney, Agent, or Firm* — Ballard Spahr LLP

(57) ABSTRACT

Methods and systems for providing content are disclosed. An example method can comprise a first device receiving a video content item via a first communication link. The video content item can comprise a plurality of fragment identifiers. A plurality of audio content items and metadata associated with the plurality of audio content items can be generated based on the video content item. At least one of the plurality of audio content items and the metadata associated with the at least one of the plurality of audio content items can be transmitted to a second device via a second communication link. The video content item and the one of the plurality of audio content items can be synchronized, based on at least one fragment identifier associated with the video content item and the metadata associated with one of the plurality of audio content items.

20 Claims, 6 Drawing Sheets

METHODS AND SYSTEMS FOR PROVIDING CONTENT

BACKGROUND

The number of content items delivered from a content provider to a user device can be limited when the user device has a limited number of identifiers to process multiple content items. There is a need for more sophisticated methods and systems for transmitting a, plurality of content items from a content provider to a, plurality of user devices and coordinating the plurality of content items provided to the plurality of user devices.

SUMMARY

It is to be understood that both the following general description and the following detailed description are exemplary and explanatory only and are not restrictive, as claimed. Methods and systems for providing content are disclosed. Specifically, a content provider can transmit a plurality of content items to a plurality of user devices, and the plurality of content items can be synchronized at the one or more user devices. The plurality of content items can comprise one or more audio content items and one or more video content items ingested from a multimedia content stream. The disclosed methods and systems can be used in delivery of video descriptions, multiple languages, different types of narration such as director commentary, actor commentary, and the like.

An example method can comprise a first device receiving a first content item such as a video content item. The first content item can comprise a plurality of fragment identifiers. A plurality of second content items such as audio content items can be generated based on the first content item. Metadata associated with the respective plurality of second content items can be generated. The first content item can be transmitted to a first device via a first communication link. At least one of the plurality of second content items and the metadata associated with the at least one of the plurality of second content items can be transmitted to a second device via a second communication link. The first content item and the at least one of the plurality of second content items can be synchronized, based on at least one fragment identifier associated with the first content item and the metadata associated with the at least one of the plurality of second content items.

In another aspect, an example method can comprise a content provider receiving a request for an audio content item from a second device. The content provider can determine a fragment identifier associated with a video content item being transmitted to a first device. The content provider can identify the audio content item and a location in the audio content item corresponding to the fragment identifier of the video content item. The location can be identified based on the fragment identifier associated with the video content item and the metadata associated with the audio content item. Accordingly, the content provider can transmit the audio content item to the second device at the identified location.

Additional advantages will be set forth in part in the description that follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
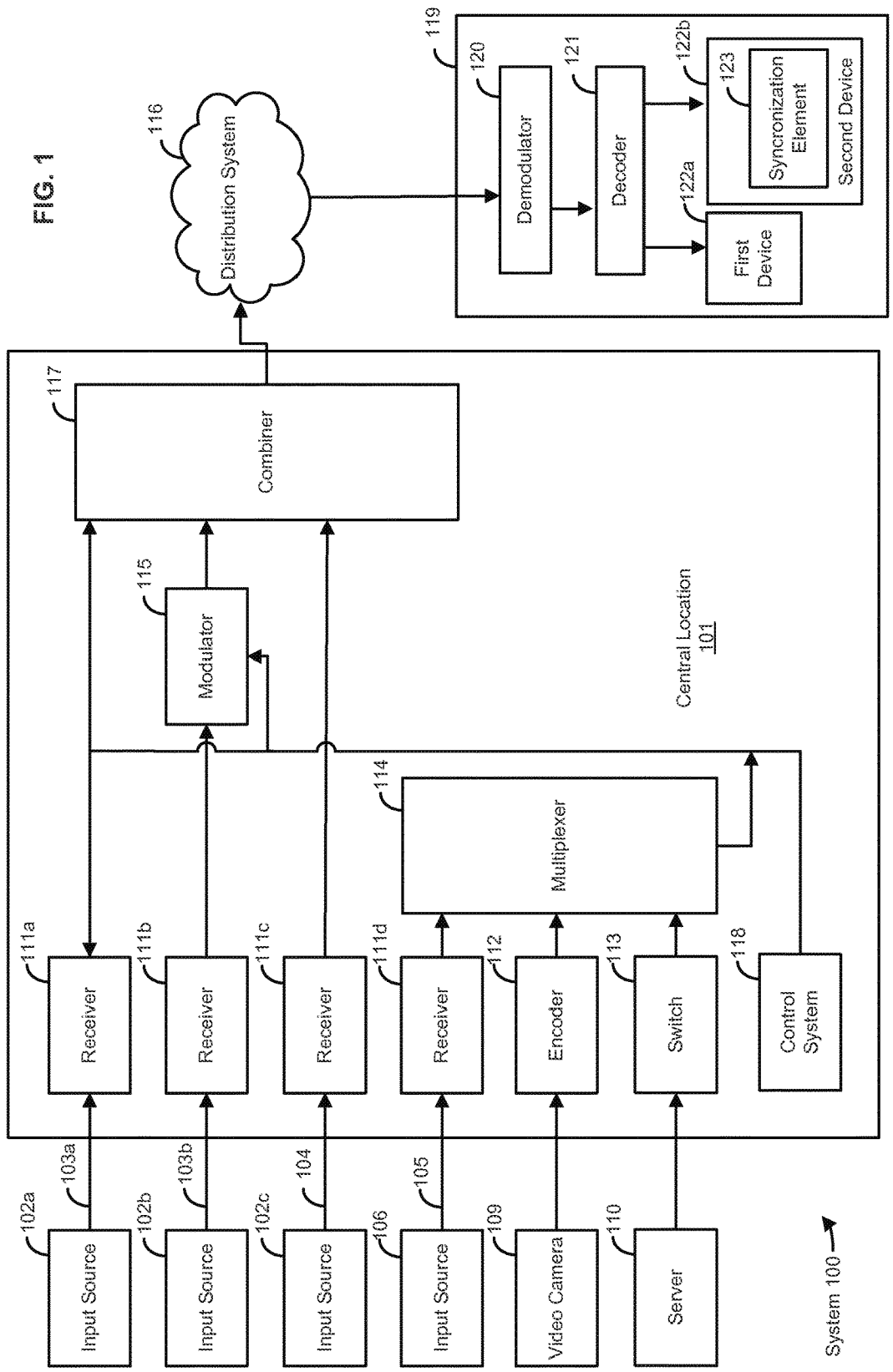
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems are related to providing content across a network. A content provider can transmit a plurality of content items to a plurality of user devices, and the plurality of content items can be synchronized at the one or more user devices. The plurality of content items can comprise one or more audio content items and one or more video content items ingested from a multimedia content stream. For example, a video content item can be provided and/or rendered at a video display device (e.g., TV) and an audio device (e.g., tablet) can select a corresponding user-selected audio content item from a content provider. The selected audio content item can be delivered to the audio device, and the audio content item can be synchronized with the video content at the audio device. In an aspect, a unique unicast of audio content item can be generated to provide a customized audio experience. The disclosed methods and systems can be used in delivery of video descriptions, multiple languages, different types of narration such as director commentary, actor commentary, and the like.

For example, a first content item can be provided and/or rendered at a first device via a first communication link, and one of a plurality of second content items can be provided and/or rendered at a second device via a second communication link. For example, a communication link can comprise a channel, a network, other communication connections, and the like. The first content item and one of the plurality of second content items can be synchronized. For example, the first content item can comprise video content, audio content, metadata, text, applications, and the like. The plurality of second content items can comprise a plurality of versions of audio content ingested from the first content item, metadata, text, applications and the like. The first device can comprise a set top box, a television, a network device, a computer, a tablet, a personal data assistant, a smart phone, and the like. The second device can comprise a set top box, a television, a network device, a tablet, a computer, a personal data assistant (PDA), a smart phone, and the like. In an aspect, the first device and the second device can be a single device.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116. In an aspect, central location 101 can provide video content, audio content, or other content (e.g., text content, metadata, application) to a plurality of devices (e.g., a first device, a second device) at a specific location (e.g., location 119) or a multitude of user locations. For example, the central location 101 can comprise a first content provider configured to provide a first content item (e.g., video, audio, metadata, text, application) to a first device 122a at location 119. The central location 101 can comprise a second content provider configured to provide second content items (e.g., audio content ingested from the first content item) to the second device 122b at location 119. The first content item and the second content item can be synchronized at the central location 101 or at location 119.

In an aspect, the second device 122b can comprise a synchronization element (e.g., synchronization element 123). For example, the synchronization element 123 can receive and process at least one of the plurality of fragment identifiers associated with the first content provided and/or render at the first device 122a, and identify a corresponding location in the second content item. For example, upon receiving the at least one fragment identifier at the second device 122b, the synchronization element 123 associated with the second device 122b can access the metadata of the second content item to identify a location that corresponds to the received at least one of the plurality of fragment identifiers associated with the first content item. For example, the metadata can comprise a time index and corresponding fragment identifiers associated with the first content item. The location can be identified as a time offset (e.g., 15 minutes 9 seconds) with respect to the beginning of the second content item.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. The distribution system 116 can comprise a plurality of channels, such as Quadrature amplitude modulation (QAM) channels, internet protocol (IP) channels, out of band (OOB) channels, an eight vestigial sideband modulation (8VSB) channel and/or the like. For example, a QAM channel can be used to provide a first content item to a first device at location 119. An IP channel can be used to provide a second content item to a second device at location 119. There can be a multitude of user locations connected to distribution system 116. At user location 119, a demodulator 120, a decoder 121, such as a gateway or home communications terminal (HCT) can decode, if needed, the signals for display on a display device, such as on a first device 122a or a second device 122b. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more decoder 121, the first device 122a, the second device 122b, the central locations 101, DVRs, home theater PCs, and the like.

In an aspect, user location 119 is not fixed. By way of example, a user can receive content from the distribution system 116 on a mobile device such as a laptop computer, PDA, smartphone, GPS, vehicle entertainment system, portable media player, and the like. In another aspect, a plurality of devices (e.g., first device, second device) at user location 119 can communicate with each other to synchronize a plurality of content items being provided and/or rendered at the plurality of devices.

Figure 2:
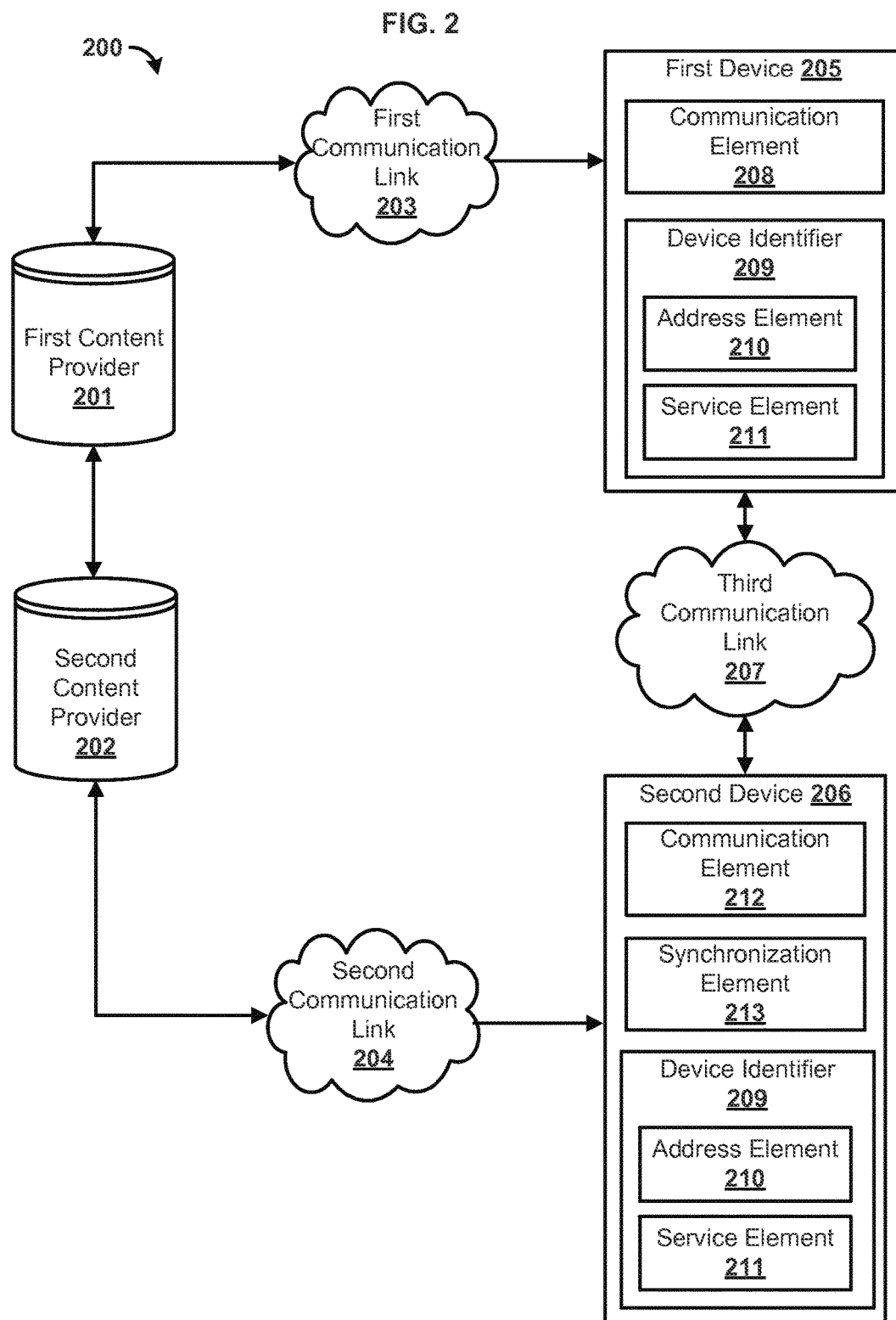
FIG. 2 is a block diagram illustrating an example system.

FIG. 2 is a block diagram illustrating an example system 200. In one aspect, the system 200 can comprise first content provider 201, second content provider 202, first communication link 203, second communication link 204, first device 205, second device 206, and third communication link 207. The first content provider 201 can be configured to provide a first content item to the first device 205 via the first communication link 203. The second content provider 202 can be configured to provide a second content item to the second device 206 via the second communication link 204. The first content provider 201 and/or the second content provider 202 can receive any form and/or type of information from one or more sources including streaming television programming, recorded audio or video, electronic programming guide data, video games, 3-D video, multi-dimensional audio, object based audio, and the like. As an example, the first content provider 201 and/or the second content provider 202 can comprise over-the-air (OTA) terrestrial transmission facilities, cable television distribution head-ends, satellite television uplink centers, broadband or internet servers, and the like. The first content provider 201 and the second content provider 202 can be implemented as separate network entities or reside in a common location.

In an aspect, the first device 205 can be configured to receive a first content item via the first communication link 203. As an example, the first device 205 can comprise a set-top box, a television, a computing device, a digital streaming device, a gateway, and/or the like. The first content item can comprise video, audio, text, metadata, applications, and other content. The first content item can be provided as one or more data streams, such as content channels, video on demand, digital video recordings, and the like.

In an aspect, the first communication link 203 can comprise a non-packet switched network (e.g., quadrature amplitude modulation based network), a packet switch network (e.g., internet protocol based network), or a combination thereof. The first network 203 can comprise network adapters, switches, routers, modems, servers, bridge, repeaters, communication gateways, a session border controllers, boundary devices, customer premises equipment (CPE), headends, cable modem termination systems (CMTS), and the like, connected through wireless links (e.g., radio frequency, satellite) and/or physical links (e.g., fiber optic cable, coaxial cable, Ethernet cable, or a combination thereof).

In an aspect, a plurality of second content items can be generated (e.g., ingested) based on the first content item. For example, the plurality of second content items can be a plurality of audio files ingested from the first content item. Examples of audio content items can be audio files generated for hearing aids (e.g., loudness), multiple language options (e.g., English, Spanish, French), parental control (e.g., certain words removed), narration, video description (e.g. for blind people), director's commentary, music-only versions, parody dialogs, minors' versions (e.g., no music or effect), 3-D audio (e.g. object based audio), and/or the like. The plurality of second content items can be in a plurality of formats such as MP3, AAC, MID, AIFF, WAV, MOV, M4A, MP4, and/or the like. In an aspect, loudness can be shaped on a server side or a client side of a content distribution network.

In an aspect, the first content item and each of the plurality of second content items (e.g., audio files) can be associated with metadata to describe the respective content items. For example, the metadata can comprise descriptions of the respective audio files, such as hearing aids (e.g., loudness), language training (e.g., English, French, Spanish), parental control, narration, music-only versions, minors' versions, 3-D audios, audio formats (e.g., mp3, mp4, wav, mid, etc.), and/or the like. A menu can be created based on the metadata of the plurality of second content items. In another aspect, metadata can comprise a time index and corresponding fragment identifiers. As an example, the time index can indicate a time offset with respect to the beginning of the respective second content item. In an aspect, the time index can comprise a time offset value from the beginning or a specific segment (e.g., packet) of the respective second content. In an aspect, the time index can comprise a corresponding packet number of the respective second content. In another aspect, the time index can comprise clock/time information carried in a program or a transport stream as a universal time reference. For example, every object (e.g., main content, advertisement) in a content item can carry timing metadata. For fragmented videos, fragment identifiers can be used as time index. In this scenario, a callback from the second device can be used to synchronize the first content item provided and/or rendered at the first device (e.g., television) and the second content item provided and/or rendered at the second device (e.g., tablet).

A specific time offset can be associated with a particular fragment identifier. For example, a fifteen-minute offset can indicate fifteen minutes after the beginning of a second content item, and the fifteen minute offset can be associated with a particular fragment identifier. When a fragment identifier is received, a corresponding location in the respective second content item can thus be identified. The plurality of second content items and metadata associated with the plurality of second content items can be deposited in the second content provider 202 and transmitted to the second device 206 via the second communication link 204.

In an aspect, the second device 206 can be configured to receive one of a plurality of second content items via the second communication link 204. As an example, the second device 206 can comprise a smartphone, a tablet, a personal data assistant (PDA), a computer, and/or the like. A second content item can comprise video, audio, text, metadata, and other content. A second content item can be provided and/or rendered as one or more data streams, such as content channels, audio on demand, digital audio recordings, and the like. In an aspect, a user of the second device 206 can select one of the plurality of second content items (e.g., audio content) from a menu created based on the metadata of the plurality of second content items.

In an aspect, the second communication link 204 can comprise a packet switched network (e.g., internet protocol based network). For example, the second communication link 204 can comprise an out of band (OOB) channel of the first communication link 203. The second communication link 204 can comprise network adapters, switches, routers, modems, servers, bridge, repeaters, communication gateways, a session border controllers, boundary devices, CPE, headends, CMTS, and the like, connected through wireless links (e.g., radio frequency, satellite) and/or physical links (e.g., fiber optic cable, coaxial cable, Ethernet cable, or a combination thereof). As an example, second content items can be digitized, packetized, and transmitted to the second device 206 via the second communication link 204 by standard protocols such as transmissions control protocol/Internet protocol (TCP/IP).

In one aspect, the third communication link 207 can comprise a wired and/or wireless network that utilizes Wi-Fi, Bluetooth, Zigbee, infrared frequency (IR), radio frequency (RF), acoustic, or any desired wired or wireless method or standard. The third communication link 207 can enable communication among one or more first devices 205 and one or more second devices 206. In an aspect, the third communication link 207 can be configured as a local area network (LAN). The third communication link 207 can comprise one or more network devices such as residential gateways, routers, modems, network switches, wireless access points, configured to connect devices (e.g., first device 205, second device 206) to Internet or a wide area network (WAN).

In one aspect, the first device 205 can comprise a communication element 208 for providing an interface to a user to interact with the first device 205. The communication element 208 can be any interface for presenting and/or receiving information to/from the user. An example interface may be communication interface, such as a web browser or a program guide to receive a request from a user to transmit a first content item. In another aspect, the communication element 208 can transmit data (e.g., fragment identifiers) related to the first content item to the second device 206. For example, the communication element 208 can broadcast one or more fragment identifiers associated with the first content item to other devices (e.g., the second device 206). In an aspect, the communication element 208 can be configured for receiving and tuning any type of content (e.g., video content, audio content). For example, the communication element 208 can receive an over-the-air broadcast signal, a direct broadcast satellite signal or a cable television signal (e.g., QAM signal) from the first content provider 201.

In one aspect, the second device 206 can comprise a communication element 212 for providing an interface to a user to interact with the second device 206. The communication element 212 can be any interface for presenting and/or receiving information to/from the user. An example interface may be communication interface, such as a web browser or a program guide to receive a request from a user to transmit one of a plurality of second content items. In an aspect, the communication element 212 can be configured for receiving and tuning any type of content (e.g., audio content). For example, the communication element 212 can receive audio content (e.g., internet protocol packets, Ethernet frames) from the second content provider 202. In another aspect, the communication element 212 can receive data (e.g., fragment identifiers) related to the first content item from the first device 205. In another aspect, the communication element 212 can be used for fine tuning the second content item provided to and/or rendered at the second device 206 to synchronize with the first content item provided and/or rendered at the first device 205. For example, a user of the second device 206 can adjust the second content item by pressing up and down buttons on the communication element 212 to fine tune the synchronization of a first content item and a second content item.

In one aspect, the first device 205 can be configured to broadcast (e.g., multicast) a current playing fragment or current frame of video over the third communication link 207. The second device 206 can tune to the broadcast to determine the video frame that is being played on the first device 205. Latency in the third communication link 207 can be negligible or can be accounted for a predefined parameter. In another aspect, the second device 206 can register with the first device 205 and receive information about current playing fragment or current frame. A network time protocol can be used to synchronize the clocks on the first device 205 and the second device 206.

In an aspect, the second device 206 can comprise a synchronization element 213. For example, a first content item can be provided and/or rendered at the first device 205, and a second content item can be provided and/or rendered at the second device 206. The synchronization element 213 can receive at least one fragment identifier associated with the first content item from the first device 205. In an aspect, the synchronization element 213 can be configured to process the at least one fragment identifier received. For example, synchronization element 213 can identify a location (e.g., a point) that corresponds to the received at least one fragment identifier based on metadata associated with the second content item. For example, the synchronization element 213 can access metadata of the second content item for a time index associated with the received fragment identifier. For example, a time index can comprise a time offset from the beginning of the second content item. Accordingly, the second content item can be provided and/or rendered at the identified location (e.g., point) in the second device 206.

In an aspect, the first device 205 and the second device 206 can be associated with respective user identifiers and/or device identifiers 209. As an example, the device identifier 209 can be any identifier, token, character, string, and/or the like, for differentiating one user or user device from another user or user device. In a further aspect, the device identifier 209 can identify a user or user device as belonging to a particular class of users or user devices. As a further example, the device identifier 209 can comprise information relating to a device (e.g., the first device 205, the second device 206), such as a manufacturer, a model or type of device, a service provider (e.g., content service provider), a state associated with respective device, a state of the a device, a locator, and/or a label or classifier. Other information can be represented by the device identifier 209. In an aspect, the device identifier 209 can be included in the communication between the first device 205 and second device 206, between the first content provider 201 and the first device 205, between the second content provider 202 and the second device 206. For example, the device identifier 209 can be received by the second content provider 202 as part of a request for a second content item (e.g., an audio content item). Upon receiving the request for a second content item, the second content provider 202 can transmit the requested second content item to the second device 206 according to the device identifier 209.

In an aspect, the device identifier 209 can comprise an address element 210 and a service element 211. In an aspect, the address element 210 can comprise or provide an internet protocol address, a network address, a media access control (MAC) address, an Internet address, or the like. As an example, the address element 210 can be relied on to establish a communication session between the first device 205 and the second device 206 or other devices and/or networks. As a further example, the address element 210 can be used as an identifier or locator of a device (e.g., the first device 205, the second device 206). In an aspect, the address element 210 can be persistent for a particular network. In an aspect, the address element 210 can be included in the communication between the first device 205 and second device 206, between the first content provider 201 and the first device 205, between the second content provider 202 and the second device 206. For example, the address element 210 can be received by the second content provider 202 as part of the request for a second content item (e.g., an audio content item) from the second device 206. Upon receiving the request for a second content item, the second content provider 202 can transmit the requested second content item to the second device 206 according to the address element 210.

In an aspect, the service element 211 can comprise an identification of a service provider associated with a device (e.g., first device 205, second device 206) and/or with the class of a device (e.g., first device 205, second device 206). The class of a device can be related to a type of device, capability of device, type of service being provided, and/or a level of service (e.g., business class, service tier, service package, etc.). As an example, the service element 211 can comprise information relating to or provided by a communication service provider (e.g., content service provider) that is providing or enabling data flow such as communication services to a device. As a further example, the service element 211 can comprise information relating to a preferred service provider for one or more particular services relating to a device. In an aspect, the address element 210 can be used to identify or retrieve data from the service element 211, or vise versa.

In an aspect, a first content item provided and/or rendered at the first device 205 can be segmented into transport packets of a predetermined size. As an example, each transport packet can comprise a fragment identifier. A fragment identifier can comprise a code, a piece of text, a message, a label, a pattern, an annotation, a marker (e.g., watermark), an index, and/or the like. In an aspect, a fragment identifier can function as a time stamp, indicating a time point (e.g., starting point, ending point), and a time interval of a respective transport packet. A time stamp can be accurate to within seconds or shorter. As another example, a fragment identifier can be a watermark that is imperceptible to human detection. For example, a watermark can be a specific frequency or a combination of a plurality of specific frequencies beyond human hearing (e.g., 20 kHz-22 kHz).

In one aspect, a second content item can be ingested from the first content item and provided and/or rendered at the second device 206. In one aspect, the second content item can be synchronized with the first content item at the second device 206. For example, the first device 205 can broadcast at least one fragment identifier of the first content item to the second device 206 via the third communication link 207. In an aspect, the second device 206 (e.g., synchronization element 213) can be configured to process the received at least one fragment identifier, and identify a location (e.g., point) in the second content item that corresponds to the at least one fragment identifier. As such, the second content item can be provided and/or rendered at the second device 206 at the identified location (e.g., point). The first content item provided and/or rendered at the first device 205 and the second content item provided and/or rendered at the second device 206 can be synchronized.

In another aspect, the second content item can be synchronized with the first content item at the second content provider 202. For example, the second device 206 can transmit a request for one of a plurality of second content items to the second content provider 202. The second content provider 202 can communicate with the first content provider 201 to receive at least one fragment identifier associated with the first content item being provided and/or rendered at the first device 205. Upon receiving the at least one fragment identifier, the second content provider 202 can select the requested second content item (e.g., audio content item), and identify a location (e.g., point) in the requested second content item that corresponds to the received at least one fragment identifier. For example, the second content provider 202 can access metadata of the requested second content item for a time index associated with the received at least one fragment identifier. Accordingly, a location (e.g., a time offset, a time point) in the requested second content item can be identified. The second content provider 202 can provide the second content item at the identified location (e.g., point) to the second device 206.

Figure 3:
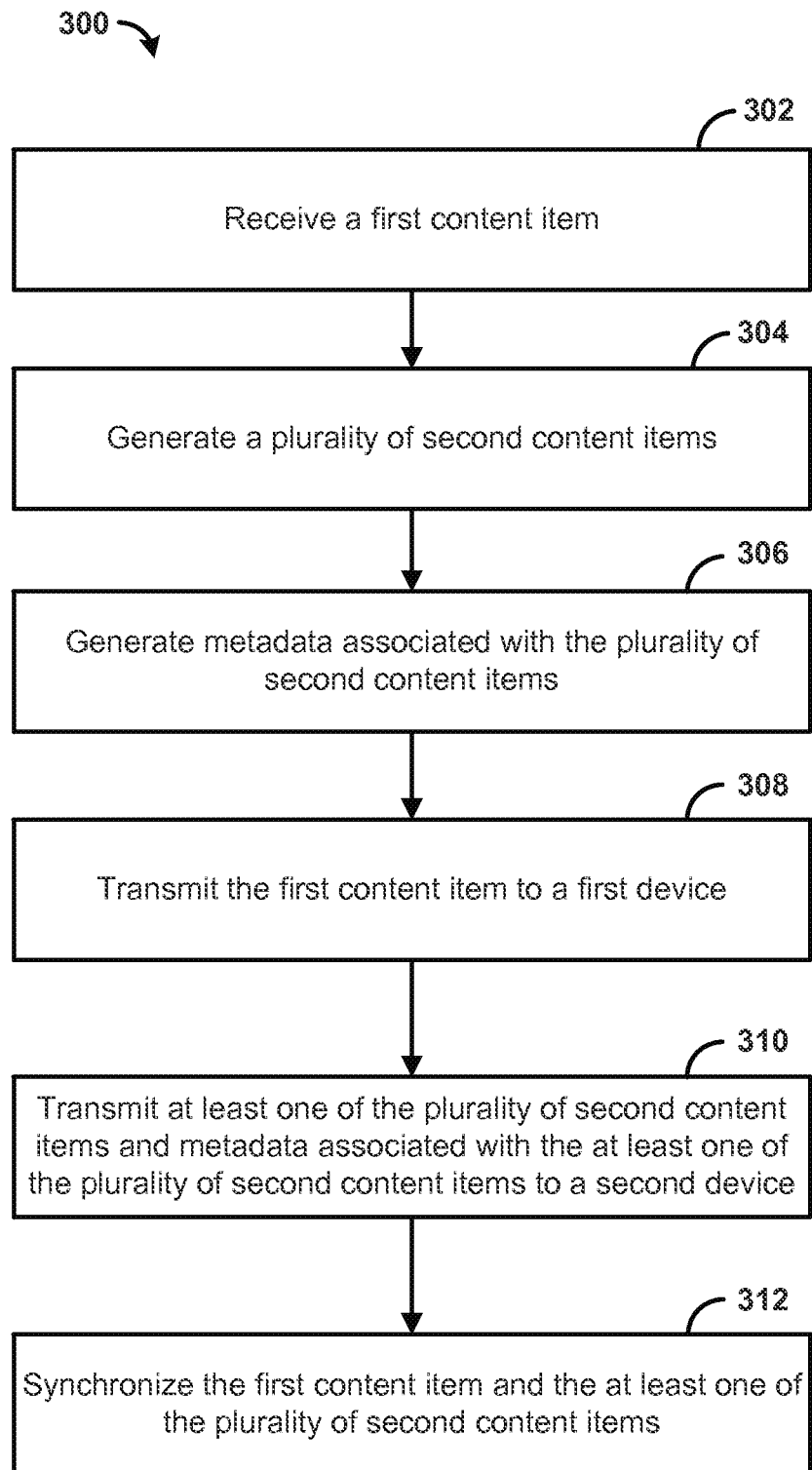
FIG. 3 is a flowchart illustrating an example method.

FIG. 3 is a flowchart illustrating an example method 300. At step 302, a first content item can be received. For example, the first content item can be received at a content provider 201. As an example, the first content item can comprise video content, audio content, text, metadata, application, and/or the like. In an aspect, the first content item can comprise a plurality of fragment identifiers. For example, the first content item can be segmented into transport packets of a predetermined size, and each transport packet can be associated with a fragment identifier. A fragment identifier can comprise a code, a piece of text, a message, a label, an annotation, a pattern, a marker, an index, a signal, and/or the like. In an aspect, a fragment identifier can function as a time stamp, indicating a time point (e.g., starting point, ending point), and a time interval for a specific transport packet. As an example, a fragment identifier can comprise a watermark that is imperceptible to human detection. A watermark can comprise a specific frequency, or a combination of a plurality of specific frequencies in a range beyond human hearing (e.g., 20 kHz-22 kHz).

At step 304, a plurality of second content items can be generated based on the first content item. In an aspect, a plurality of second content items can be ingested from the first content item. The plurality of second content items can comprise a plurality of audio content items associated with the first content item. Examples of second content items can comprise audio files generated for hearing aids (e.g., loudness), language training (e.g., English, French, Spanish), parental control (e.g., certain words removed), narration (e.g. for blind people), director's commentary, music only versions, parody dialogs, minors' versions (e.g., no music or effect), 3-D audio (e.g. object based audio), and content formats (e.g., MP3, AAC, MID, AIFF, WAV, MOV, M4A, MP4). The plurality of second content items can be stored at the second content provider 202 and transmitted to the second device 206 via the second communication link 204.

At step 306, metadata associated with the plurality of second content items can be generated. In an aspect, metadata can comprise descriptions of the respective second content items (e.g., audio files), such as hearing aids, language training, parental control, narration, music only versions, minor's versions, 3-D audio, content format, and/or the like. A menu can be created based on the descriptions of the respective audio files. Accordingly, a user of the second device 206 can select a particular second content item from the created menu. In another aspect, the metadata can comprise a time index, and corresponding fragment identifiers associated with the first content item. As an example, the time index can comprise a time offset with respect to the beginning of a second content item. As another example, the time index can comprise a time point (starting point, end point), and a time interval associated with a specific segment of a second content item.

At step 308, the first content item can be transmitted to a first device via a first communication link. For example, first content provider 201 can distribute (e.g., multicast, unicast) the first content item to the first device 205 via a first communication link 203. In an aspect, the first communication link 203 can be a quadrature amplitude modulation (QAM) channel, an internet protocol (IP) channel, or combination thereof. The first communication link can comprise network adapters, switches, routers, modems, servers, bridge, repeaters, communication gateways, a session border controllers, boundary devices, CPE, headends, CMTS, and the like, connected through wireless links and/or physical links. As an example, the first device 205 can comprise a set top box, a television, a network device, a computer, a tablet, a personal data assistant, a smart phone, and the like.

At step 310, at least one of the plurality of second content items and the metadata associated with the at least one of the plurality of second content items can be transmitted to a second device via a second communication link. For example, a user of the second device 206 can select a particular second content item from a menu created according to the metadata of the plurality of second content items. In an aspect, the second communication link can be an internet protocol (IP) channel. For example, the second communication link 204 can be an out of band (OOB) channel of the first communication link 203. The second communication link can comprise network adapters, switches, routers, modems, servers, bridge, repeaters, communication gateways, a session border controllers, boundary devices, CPE, headends, CMTS, and the like, connected through wireless links and/or physical links. As an example, the second device 206 can comprise a set top box, a television, a network device, a computer, a tablet, a personal data assistant, a smart phone, and the like.

At step 312, the first content item and the at least one of the plurality of second content items can be synchronized based on at least one fragment identifier of the first content item, and the respective metadata associated with the one of the plurality of second content items. For example, the second content provider 202 can receive a fragment identifier associated with the first content from the first content provider 201. The second content provider 202 can access the metadata of the second content item to identify a corresponding location (e.g., point) in the second content item being provided and/or rendered at the second device 206. As an example, the metadata can comprise a time index and corresponding fragment identifiers associated with the first content item. For example, the location (e.g., point) can be identified as a time offset (e.g., 15 minutes 9 seconds) with respect to the beginning of the second content item. The second content item can be provided and/or rendered at the second device 206 at the identified location (e.g., point, time offset). Thus, the second content item can be synchronized with the first content item.

Figure 4:
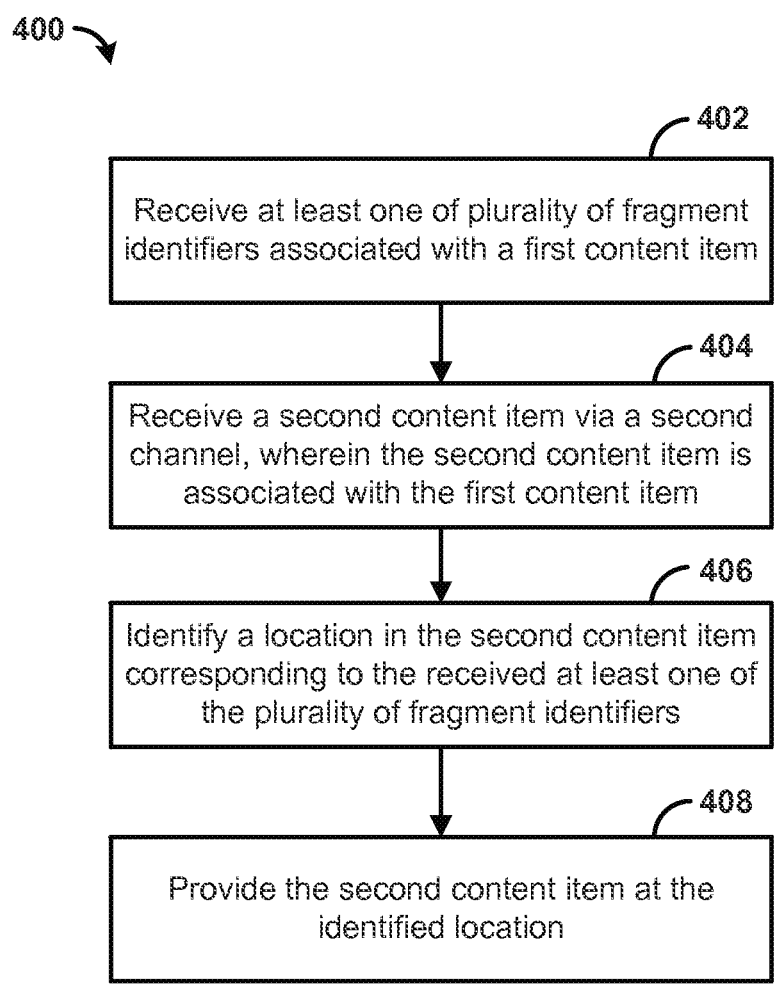
FIG. 4 is a flowchart illustrating another example method.

FIG. 4 is a flowchart illustrating another example method 400. At step 402, at least one of the plurality of fragment identifiers can be received. In an aspect, the at least one of the plurality of fragment identifiers can be associated with a first content item. In an aspect, the first content item can be transmitted to the first device 205 via a first communication link. As an example, the first content item can comprise a video content, audio content, metadata, application, text, and the like. As another example, the first device 205 can comprise a set top box, a television, a network device, a computer, a tablet, a personal data assistant, a smart phone, and the like. In an aspect, the first device 205 can broadcast at least one of the plurality of fragment identifiers to the second device 206 via the third communication link 207. In another aspect, the second device 206 (e.g., the synchronization element 213) can access (e.g., detect, process, decode) at least one of the plurality of fragment identifiers (e.g., watermarks) of the first content item. For example, the second device 206 can access at least one of the plurality of fragment identifiers by reading the header of at least one corresponding fragment. In a scenario that the first device 205 and the second device 206 are a single device, at least one of the plurality of fragment identifiers can be received without using the third communication link 207.

At step 404, a second content item can be received via a second communication link. For example, the second content item can be transmitted from the second content provider 202 to the second device 206 via the second communication link 204. The second content item can be associated with a first content item. As an example, the second device 206 can comprise a set top box, a television, a network device, a computer, a tablet, a personal data assistant, a smart phone, and the like. In an aspect, the first device 205 and the second device 206 can be a single device. The second content item can be ingested from the first content item. The second content item can comprise audio content, text, metadata, application, and the like. In an aspect, the first content item can be associated with a plurality of fragment identifiers.

In an aspect, the second content item can be associated with metadata. In an aspect, metadata can comprise descriptions of the respective second content items (e.g., audio files) for diverse purposes, such as hearing aids, language training, parental control, narration, music-only versions, minor's versions, 3-D audio, content formats, and/or the like. A menu can be created based on the descriptions of the respective audio files. Accordingly, a user of the second device 206 can select a particular second content item from the menu. In another aspect, metadata can comprise a time index and corresponding fragment identifiers associated with the first content item. As an example, the time index can comprise a time offset with respect to the beginning of a second content item. As another example, the time index can comprise a time point (e.g., starting point, end point), and a time interval associated with a specific segment of a second content item.

At step 406, a location in the second content item corresponding to the received at least one of the plurality of fragment identifiers can be identified based on the metadata. For example, the second device 206 (e.g., the synchronization element 213) can process the at least one of the plurality of fragment identifiers received from the first device 205, and identify a corresponding location (e.g., point) in the second content item. For example, upon receiving the at least one fragment identifier, the second device 206 (e.g., synchronization element 213) can access the metadata of the second content item to identify a location (e.g., point) that corresponds to the received at least one of the plurality of fragment identifiers. For example, the metadata can comprise a time index and corresponding fragment identifiers associated with the first content item. The location can be identified as a time offset (e.g., 15 minutes 9 seconds) with respect to the beginning of the second content item or a specific segment of audio content item.

At step 408, the second content item can be provided and/or rendered at the identified location in the second content item. The second content item can be played on the second device 206 at the identified location (e.g., point) to synchronize the first content item being provided and/or rendered at the first device 205. In an aspect, a user can adjust the second content item on the second device 206, for example, by pressing up and down buttons on the communication element 212 to achieve the fine tuning of the synchronization of the first content item and the second content item.

Figure 5:
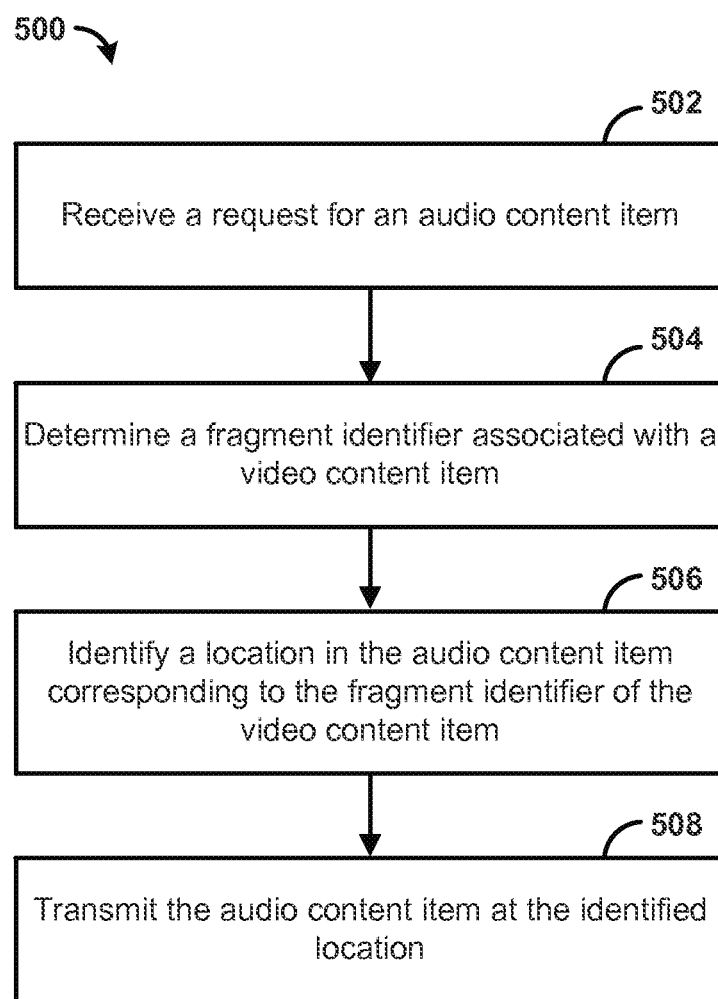
FIG. 5 is a flowchart illustrating an example method.

FIG. 5 is a flowchart illustrating an example method for providing content. At step 502, a request for an audio content item can be received. In an aspect, the second content provider 202 can receive a request for an audio content item from the second device 206. The audio content item can be associated with a video content item transmitted to a first device 205. As an example, the first device 205 can comprise a set top box, a television, a network device, a computer, a tablet, a personal data assistant, a smart phone, and the like. As an example, the second device 206 can comprise a set top box, a television, a network device, a computer, a tablet, a personal data assistant, a smart phone, and the like. In an aspect, the first device 205 and the second device 206 can be a single device.

In an aspect, a user of the second device 206 can request a specific audio content item from a plurality of audio content items from a menu. An audio content item can be requested for diverse purposes, such as hearing aids (e.g., loudness), language training (e.g., English, French, Spanish), parental control (e.g., certain words removed), narration (e.g. for blind people), director's commentary, music-only versions, parody dialogs, minors' versions (e.g., no music or effect), 3-D audio (e.g. object based audio), audio content format (e.g., MP3, AAC, MID, AIFF, WAV, MOV, M4A, MP4) and/or the like.

At step 504, a fragment identifier associated with a video content item being transmitted can be determined. In an aspect, the second content provider 202 can communicate with the first content provider 201 to receive a fragment identifier associated with the video content item being transmitted to the first device 205. For example, the first content provider 201 can transmit the fragment identifier to the second content provider 202 via wired and/or wireless communication protocols. As another example, the second content provider 202 can access (e.g., detect, process, decode) the fragment identifier (e.g., watermark).

At step 506, a location in the audio content item corresponding to the fragment identifier of the video content item can be identified. The audio content item and a location (e.g., point) in the audio content item can be identified at the second content provider 202 based on metadata associated with the requested audio content item. In an aspect, the metadata can comprise descriptions of the respective audio files. In another aspect, metadata can comprise a time index and corresponding fragment identifiers. As an example, the time index can indicate a time offset with respect to the beginning of the respective second content item. For example, a fifteen-minute offset can indicate fifteen minutes after the beginning of a second content item, and the fifteen minute offset can be associated with a particular fragment identifier. When a fragment identifier is received, a corresponding location (e.g., point) in the audio content item can thus be identified. For example, the location can be identified in terms of a time offset (e.g., 15 minutes 9 seconds) with respect to the beginning of the audio content or a specific segment of audio content item.

At step 508, the audio content item can be transmitted at the identified location (e.g., time point) in the audio content item. As such, the audio content item being provided and/or rendered at the second device 206 can be synchronized with the video content item being provided and/or rendered at the first device 205. In an aspect, a user of the second device 206 can adjust the second content item, for example, by pressing up and down buttons on the communication element 212 to achieve the fine tuning of the synchronization of the video content item and the audio content item.

Figure 6:
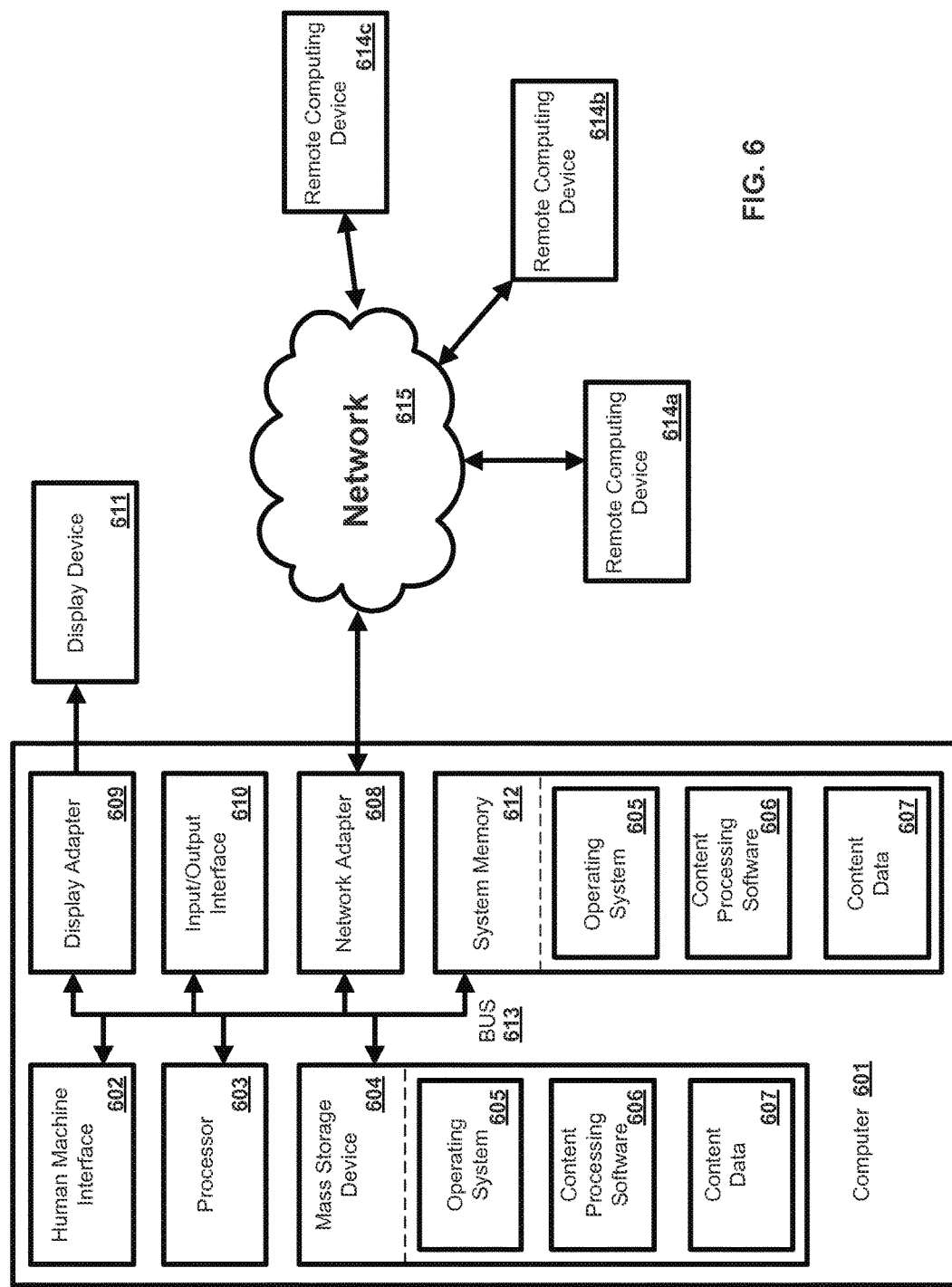
FIG. 6 is a block diagram illustrating an example computing system in which the present methods and systems can operate.

In an exemplary aspect, the methods and systems can be implemented on a computer 601 as illustrated in FIG. 6 and described below. By way of example, server 110 of FIG. 1, the first content provider 201, the second content provider 202, the first device 205, and/or the second device 206 of FIG. 2 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the processor 603 to the system memory 612. In the case of multiple processors 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, content processing software 606, content data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as content data 607 and/or program modules such as operating system 605 and content processing software 606 that are immediately accessible to and/or are presently operated on by the processor 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 205 and content processing software 606. Each of the operating system 605 and content processing software 606 (or some combination thereof) can comprise elements of the programming and the content processing software 606. Content data 607 can also be stored on the mass storage device 604. Content data. 607 can be stored in any of one or more databases known in the art. Examples of such databases comprise, DB2®, Microsoft® Access, Microsoft® SQL Server, Oracle®, mySQL, PostgreSQL, HBase, Mongrel, Hadoop, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of content processing software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (A) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
  receiving, by a network device, a first content item that comprises a plurality of fragment identifiers;
  determining, based on a device identifier associated with a first device, that the first device is configured to communicate via Quadrature Amplitude Modulation (QAM);
  transmitting, to the first device via QAM, the first content item;
  determining, based on a request from a second device and based on a device identifier associated with the second device, that the second device is configured to communicate via Internet Protocol (IP); and
  transmitting, to the second device via IP, at least one second content item, of a plurality of second content items related to the first content item, and metadata associated with the at least one second content item, wherein the metadata and at least one fragment identifier of the plurality of fragment identifiers facilitate synchronization of the first content item and the at least one second content item.

2. The method of claim 1, wherein at least one of the first device or the second device comprises at least one of a set-top box, a television, a computing device, a digital streaming device, or a gateway device.

3. The method of claim 1, wherein the first content item comprises a video content item and an audio content item, and wherein the plurality of second content items comprises a plurality of audio content items.

4. The method of claim 1, further comprising transmitting, to a third device, at least a portion of the first content item or a portion of the at least one second content item of the plurality of second content items via a communication technique that is different than QAM and IP.

5. The method of claim 4, wherein the communication technique is associated with an eight vestigial sideband modulation (8VSB) channel.

6. The method of claim 1, wherein the plurality of fragment identifiers comprises one or more of a plurality of time stamps or a plurality of watermarks.

7. The method of claim 1, wherein the metadata and at least one fragment identifier of the plurality of fragment identifiers facilitate synchronization of the first content item and the at least one second content item based on associating the at least one fragment identifier with the metadata.

8. The method of claim 1, further comprising selecting the at least one second content item of the plurality of second content items based on the metadata.

9. A method comprising:
receiving, by a first user device based on a device identifier, from a network device via Internet Protocol (IP), at least one fragment identifier of a plurality of fragment identifiers associated with a first content item, wherein the first content item is received by a second user device via Quadrature Amplitude Modulation (QAM);
receiving metadata associated with a plurality of second content items, wherein the plurality of second content items are different audio versions of the first content item;
receiving, based on the metadata, an indication of a selection of one second content item of the plurality of second content items;
transmitting, to the network device via IP, the indication; and
receiving, from the network device via IP, based on the indication, the selected one second content item of the plurality of second content items at a location within the selected one second content item of the plurality of second content items corresponding to the at least one fragment identifier of the plurality of fragment identifiers.

10. The method of claim 9, wherein the first content item comprises a video content item and an audio content item.

11. The method of claim 9, further comprising transmitting, by the network device to a third device, at least a portion of the first content item or a portion of the plurality of second content items via a communication technique that is different than QAM and IP.

12. The method of claim 9, wherein at least one of the first user device or the second user device comprises at least one of a set-top box, a television, a computing device, a digital streaming device, or a gateway device.

13. The method of claim 9, wherein the plurality of fragment identifiers comprises one or more of a plurality of watermarks or a plurality of time stamps.

14. The method of claim 9, wherein receiving the indication of the selection of one second content item of the plurality of second content items comprises receiving an interaction between the first user device and a user of the first user device.

15. A method comprising:
receiving, by a network device from a first device, a request for an audio content item, wherein the request comprises a device identifier;
determining a fragment identifier associated with a video content item being transmitted to a second device via Quadrature Amplitude Modulation (QAM);
determining, based on metadata associated with the fragment identifier, a location in the audio content item corresponding to the fragment identifier associated with the video content item;
determining, based on the device identifier, that the first device is configured to communicate via Internet Protocol (IP); and
transmitting, to the first device via IP, based on the determined location in the audio content item, the audio content item.

16. The method of claim 15, further comprising transmitting, to a third device, at least a portion of the audio content item or a portion of the video content item via a communication technique that is different than QAM and IP.

17. The method of claim 15, wherein the second device is configured to communicate via an eight vestigial sideband modulation (8VSB) channel.

18. The method of claim 15, wherein at least one of the first device or the second device comprises at least one of a set-top box, a television, a computing device, a digital streaming device, or a gateway device.

19. The method of claim 15, wherein the fragment identifier comprises a time stamp.

20. The method of claim 15, wherein the fragment identifier comprises a watermark.

* * * * *